United States Patent
Matsumura et al.

(10) Patent No.: US 10,857,747 B2
(45) Date of Patent: Dec. 8, 2020

(54) MOLD CLEANING SYSTEM

(71) Applicant: The Yokohama Rubber Co., LTD., Tokyo (JP)

(72) Inventors: Kensuke Matsumura, Shinshiro (JP); Masayuki Watanabe, Shinshiro (JP); Yusaku Miyazaki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 329 days.

(21) Appl. No.: 15/322,059

(22) PCT Filed: Jun. 24, 2015

(86) PCT No.: PCT/JP2015/068136
§ 371 (c)(1),
(2) Date: Dec. 23, 2016

(87) PCT Pub. No.: WO2015/199113
PCT Pub. Date: Dec. 30, 2015

(65) Prior Publication Data
US 2017/0136720 A1    May 18, 2017

(30) Foreign Application Priority Data

Jun. 26, 2014   (JP) .................................. 2014-131770

(51) Int. Cl.
*B08B 7/00*     (2006.01)
*B23K 26/08*    (2014.01)
(Continued)

(52) U.S. Cl.
CPC ........ *B29D 30/0662* (2013.01); *B08B 7/0042* (2013.01); *B23K 26/08* (2013.01);
(Continued)

(58) Field of Classification Search
CPC .. B08B 7/0042; B23K 26/0884; B23K 26/36; B29C 2033/705; B29D 30/0662;
(Continued)

(56) References Cited

U.S. PATENT DOCUMENTS

| 6,369,353 B1 | 4/2002 | Soska |
| 2005/0205539 A1 | 9/2005 | Borgoltz et al. |

(Continued)

FOREIGN PATENT DOCUMENTS

| JP | 2002-503551 | 2/2002 |
| JP | 2003-112136 | 4/2003 |

(Continued)

OTHER PUBLICATIONS

International Search Report for International Application No. PCT/JP2015/068136 dated Sep. 15, 2015, 4 pages, Japan.

*Primary Examiner* — Levon J Shahinian
(74) *Attorney, Agent, or Firm* — Thorpe North & Western

(57) ABSTRACT

Provided is a mold cleaning system. When cleaning a mold, the mold cleaning system acquires three-dimensional image data of a molding surface of the mold by a camera and, on the basis of the acquired image data, the mold cleaning system controls the movement of arms using a control device, moves a laser head along the molding surface while irradiating with a laser beam supplied by a laser oscillator and, as a result, removes dirt adhered to the molding surface.

8 Claims, 7 Drawing Sheets

(51) Int. Cl.
*B23K 26/36* (2014.01)
*B29C 33/70* (2006.01)
*B29C 33/72* (2006.01)
*B29D 30/06* (2006.01)
*G05D 3/12* (2006.01)
*B29C 33/02* (2006.01)
*B29K 21/00* (2006.01)
*B29L 30/00* (2006.01)

(52) U.S. Cl.
CPC .......... *B23K 26/0884* (2013.01); *B23K 26/36* (2013.01); *B29C 33/02* (2013.01); *B29C 33/72* (2013.01); *G05D 3/12* (2013.01); *B29C 2033/705* (2013.01); *B29D 2030/0663* (2013.01); *B29K 2021/00* (2013.01); *B29L 2030/00* (2013.01)

(58) Field of Classification Search
CPC ........ B29D 2030/0663; B29K 2021/00; B29L 2030/00; G05D 3/12
USPC .... 134/1.1, 22.1, 56 R, 123, 166 R; 425/225
See application file for complete search history.

(56) References Cited

U.S. PATENT DOCUMENTS

2009/0032055 A1   2/2009   Seko et al.
2010/0038560 A1*   2/2010   Tokura ................. B08B 7/0042
                                                    250/492.1

FOREIGN PATENT DOCUMENTS

| | | |
|---|---|---|
| JP | 2004-167744 | 6/2004 |
| JP | 2004-243215 | 9/2004 |
| JP | 2005-532170 | 10/2005 |
| JP | 2007-021518 | 2/2007 |
| JP | 2007-038502 | 2/2007 |
| JP | 2008-062633 | 3/2008 |
| JP | 2010-274481 | 12/2010 |
| JP | 2013-086148 | 5/2013 |
| KR | 10-0466138 | 1/2005 |
| KR | 10-2010-0021969 | 2/2010 |
| WO | WO 1999/42228 | 8/1999 |
| WO | WO 2004/007136 | 1/2004 |
| WO | WO 2007/015496 | 2/2007 |

* cited by examiner

ND CLEANING SYSTEM

MOLD CLEANING SYSTEM

TECHNICAL FIELD

The present technology relates to a mold cleaning system; and particularly relates to a mold cleaning system which makes it possible to prevent scratches on a molding surface while efficiently removing dirt therefrom without requiring a manual operation by a person, even for molds having complicated molding-surface shapes.

BACKGROUND ART

Dirt derived from rubber components or compounding agents is adhered slightly to a molding surface of a mold for vulcanizing rubber products such as tires every time the vulcanization is performed. Since the dirt gradually accumulates as the mold is used repeatedly, leaving the dirt as it is negatively impacts the quality of the products to be vulcanized. Thus, as appropriate, the dirt needs to be removed by cleaning the molding surface. Examples of known mold cleaning methods include a shot blasting cleaning method, a laser beam cleaning method, and a plasma cleaning method.

With the shot blasting cleaning method, the molding surface is easy to be scratched. Thus, to prevent scratches on the molding surface caused by the cleaning, it is desirable to use the laser beam cleaning method in which the molding surface is irradiated with a laser beam and the dirt is removed by the shock wave caused by the irradiation, or to use the plasma cleaning method in which the dirt is removed with the chemical reaction of the dirt caused by a generated plasma. However, an area that the plasma cleaning method can clean in a unit time is small. Therefore, the laser beam cleaning method is more desirable considering efficiency.

Various mold cleaning methods using laser beam have been proposed (for example, see Japanese Unexamined Patent Application Publication Nos. 2008-62633A and 2004-167744A). In the cleaning method disclosed in Japanese Unexamined Patent Application Publication No. 2008-62633A, the dirt is removed by irradiating, from a laser head, the molding surface of the mold with a laser beam ($CO_2$ laser beam) supplied from a laser oscillator. At this time, an arm (manipulator) that moves the laser head is controlled by the original shape data (CAD data etc.) of the mold and a position correction means for the laser head and the arm moves the laser head along concavities and convexities on the molding surface (see paragraphs [0011] and [0021] to [0025] etc. of Japanese Unexamined Patent Application Publication No. 2008-62633A).

However, the molding surface of the mold is not always formed in the same shape but is formed in various shapes. Thus, in the method disclosed in Japanese Unexamined Patent Application Publication No. 2008-62633A, to clean molds having different molding-surface shapes, an operation for invoking the original shape data of the mold stored in a control device is required every time the mold cleaning is performed. In the case of tire vulcanization molds for which there are numerous types of molding-surface shapes, there is a problem that a checking if the mold to be cleaned and the original shape data therefor correspond to each other is required every time the cleaning is performed and thereby the operation becomes complicated.

In the cleaning method disclosed in Japanese Unexamined Patent Application Publication No. 2004-167744A, a laser irradiator is fixed to a predetermined position, and a mold is rotated to move the mold so that the mold surface changes from a vertical posture into a slanting posture with respect to the optical axis of the laser beam. A process such as teaching this motion in advance is required to rotate the mold in this way.

SUMMARY

The present technology provides a mold cleaning system which makes it possible to prevent scratches on a molding surface while efficiently removing dirt therefrom without requiring a manual operation by a person, even for molds having complicated molding-surface shapes.

A mold cleaning system of the present technology is provided with a laser oscillator, a laser head configured to irradiate a molding surface of a mold with a laser beam supplied from the laser oscillator, an arm configured to move the laser head freely in three dimensions, a control device configured to control the motion of the arm, and a camera configured to acquire three-dimensional image data of a molding surface of a mold to be cleaned. In such a mold cleaning system, by controlling the motion of the arm on the basis of the image data acquired by the camera when the mold is cleaned, the laser head is moved along the molding surface while irradiating with the laser beam to clean the molding surface.

According to the present technology, when cleaning a mold, three-dimensional image data of a molding surface of the mold to be cleaned is acquired by a camera. As such, the shape of the molding surface of the mold can be accurately determined at the time of cleaning. Thus, it is no longer required to perform manual operations for invoking the shape data of the molding surface of the mold to be cleaned from a database and to check the correspondence relation between the actual mold and the shape data every time the cleaning is performed. Also, since the laser head is moved along the molding surface on the basis of the acquired image data while irradiating with the laser beam to clean the molding surface, it is possible to prevent scratches on the molding surface while efficiently removing the dirt therefrom without requiring a manual operation by a person, even for molds having complicated molding-surface shapes. Additionally, even if the shape of the molding surface changes with time, there are advantages compared to a case where pre-recorded shape data of the molding surface is used in that the molding surface can be more completely cleaned without leaving traces of dirt because the image data of the molding surface is acquired at the time of cleaning.

Here, for example, the mold cleaning system may be configured to determine a cleaning state of the molding surface on the basis of three-dimensional image data of a cleaned molding surface of a mold acquired by the camera; store the determined cleaning state and position information of the molding surface in the control device; and for positions on the molding surface in which the determined cleaning state does not satisfy a preset standard, perform cleaning again by irradiating with the laser beam from the laser head. With this configuration, only the positions (range) that are particularly dirty are re-cleaned later, which is advantageous for removing the dirt efficiently and cleanly.

The mold cleaning system can also be provided with a plurality of laser heads having different laser irradiation widths as the laser head. The mold cleaning system can also be configured to perform cleaning for particular preset portions by using a laser head having a relatively small laser irradiation width or by using a laser head having a relatively large laser irradiation width with the laser head having a relatively small laser irradiation width. With this configuration, the cleaning can be finished in a short time by using the laser head having a relatively large laser irradiation width for relatively flat and wide portions. Meanwhile, for portions in which concavities and convexities exist complicatedly in a narrow range on the molding surface, the portions having complicated shapes can be evenly irradiated with the laser beam by using the laser head having a relatively small laser irradiation width, and as a result, the dirt can be removed cleanly.

The mold cleaning system can also be provided with a temperature sensor configured to successively detect a temperature of the molding surface that is irradiated with the laser beam. The mold cleaning system can also be configured to suspend an irradiation with the laser beam when the temperature detected by the temperature sensor exceeds a preset acceptable temperature. With this configuration, the molding surface can be avoided from being overheated by the irradiated laser beam. As such, a defect that the molding surface is thermally deformed by the laser beam can be prevented.

Although studless-tire vulcanization molds have complicated molding-surface shapes and cast splicing molds for pneumatic tire vulcanization have small gaps defined on the molding surfaces thereof, by applying the present technology, scratches on the molding surfaces can be prevented while efficiently removing the dirt therefrom.

DETAILED DESCRIPTION

Figure 1:
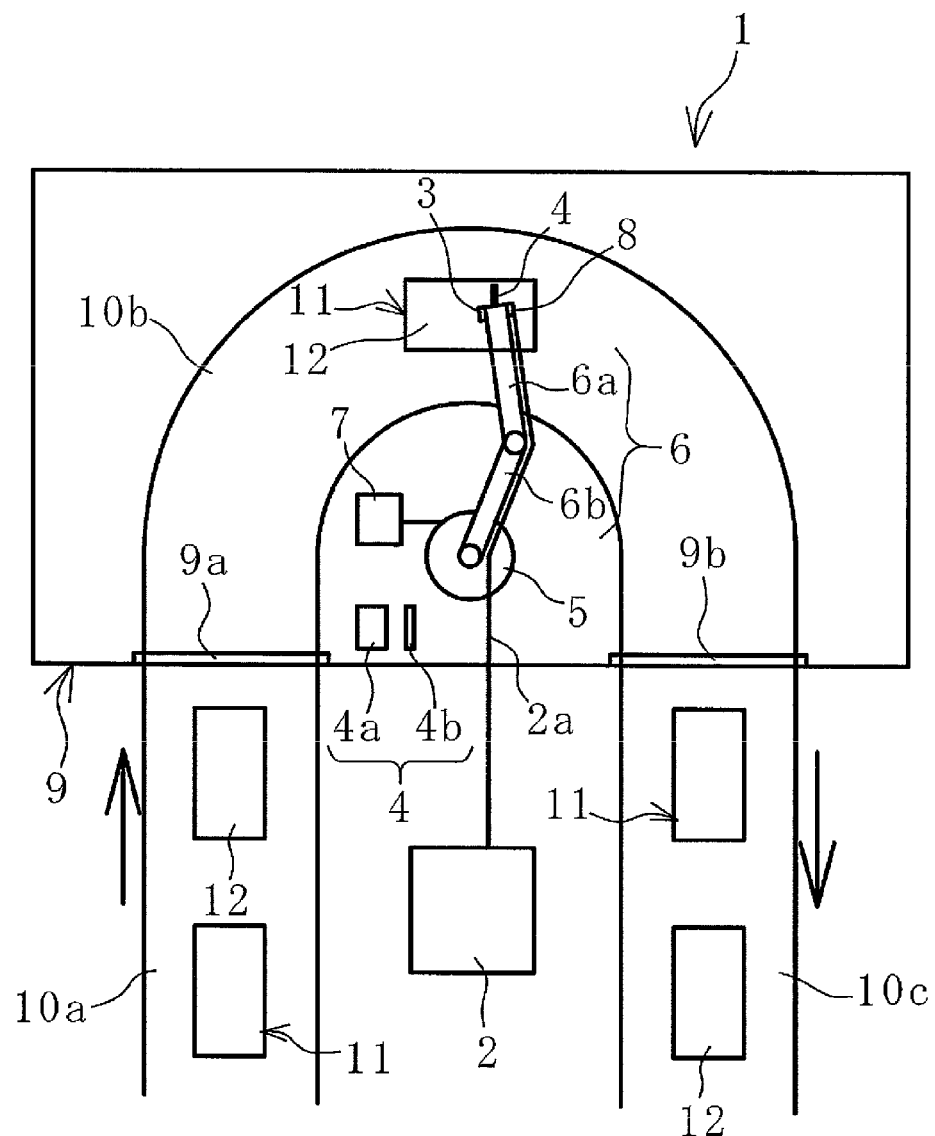
FIG. 1 is an explanatory drawing illustrating a mold cleaning system of the present technology as viewed in a plan view.

A mold cleaning system of the present technology will now be described on the basis of the embodiments illustrated in the drawings.

Although a tire vulcanization mold is to be cleaned in the following description, the present technology can also be used to clean molds for vulcanizing other rubber products than tires.

A mold cleaning system 1 of the present technology illustrated in FIG. 1 is provided with a laser oscillator 2, a laser head 4, an arm 6 to which the laser head 4 is attached, a control device 7 that controls the motion of the arm 6, and a camera 3. The camera 3 acquires three-dimensional image data of a molding surface 12 of a mold 11. In this embodiment, the mold cleaning system 1 is further provided with a temperature sensor 8 that successively detects a temperature of the molding surface 12 that is irradiated with a laser beam L. The camera 3 and the temperature sensor 8 are attached to a tip of the arm 6, and the image data acquired by the camera 3 and the temperature data detected by the temperature sensor 8 are input into the control device 7.

The main components of the cleaning system 1 except for the laser oscillator 2 are disposed in a cleaning booth 9, which becomes a closed space. The cleaning booth 9 is provided with an inlet door 9a and an outlet door 9b and has a structure that becomes a closed space and can shield the laser beam L when the inlet door 9a and the outlet door 9b are closed.

The inlet door 9a is connected with a carrying-in conveyor apparatus 10a and the outlet door 9b is connected with a carrying-out conveyor apparatus 10c. The space between the carrying-in conveyor apparatus 10a and the carrying-out conveyor apparatus 10c becomes an internal space of the cleaning booth 9 and a processing conveyor apparatus 10b is disposed at this position. In this embodiment, the processing conveyor apparatus 10b is bent and extended to be an arc shape. The mold 11 to be cleaned is placed on the carrying-in conveyor apparatus 10a and the cleaned mold 11 is placed on the carrying-out conveyor apparatus 10c. The processing conveyor apparatus 10b functions as a processing table when the mold 11 is cleaned.

The laser oscillator 2 and the laser head 4 are connected by an optical fiber cable 2a. The laser beam L supplied by the laser oscillator 2 is transmitted to the laser head 4 through the optical fiber cable 2a. In the present technology, it is preferable to use a YAG (yttrium aluminium garnet) laser beam as the laser beam L.

The molding surface 12 of the mold 11 is irradiated with the laser beam L by the laser head 4. The arm 6 is rotatably attached to an arm base 5 and is configured by rotatably connecting a plurality of arm parts 6a, 6b. The laser head 4 is removably attached to the tip of the arm 6. Therefore, the laser head 4 can be moved freely in three dimensions by controlling the motion of the arm 6.

Figure 6:
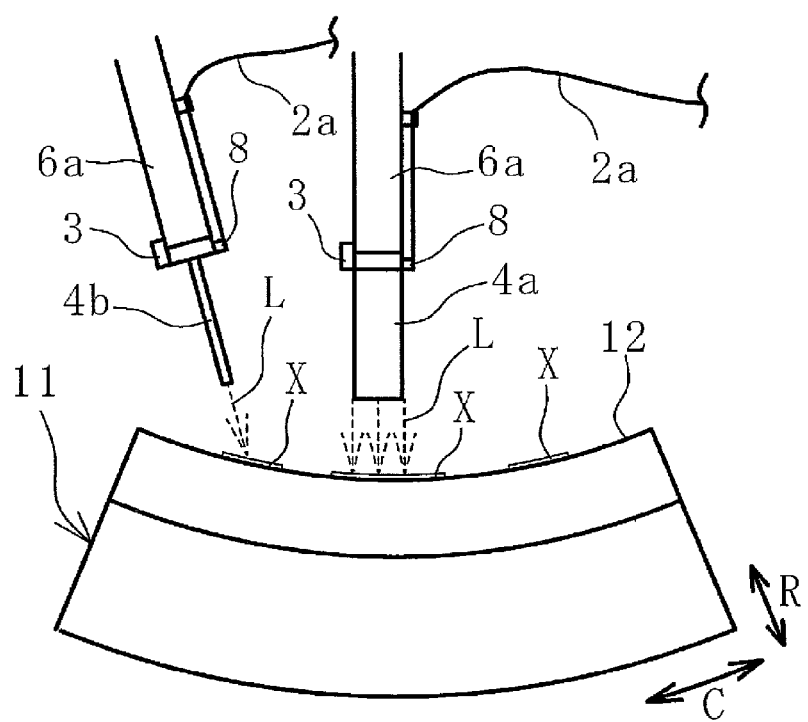
FIG. 6 is an explanatory drawing illustrating a laser head and a mold to be cleaned as viewed in a side view.

In this embodiment, a plurality of laser heads 4a, 4b having different laser irradiation widths are provided as illustrated in FIG. 6. One is the laser head 4a having a relatively large laser irradiation width and the other is the laser head 4b having a relatively small laser irradiation width. The laser head 4a has a configuration in which a galvano mirror is incorporated and the laser beam L can be scanned in a width direction and a wider range can be irradiated with the laser beam L. The laser irradiation width is variable (for example, from 4 to 70 mm). The other laser head 4b irradiates a pinpoint with the laser beam L. A plurality of the laser heads 4a having variable laser irradiation widths may be provided to use a different laser irradiation width for each laser head. For example, the oscillating frequency of the laser oscillator 2 is from 10 to 40 kHz. The frequency in which the laser beam L is scanned from the laser head 4a in the width direction is, for example, from 20 to 150 Hz.

Figure 2:
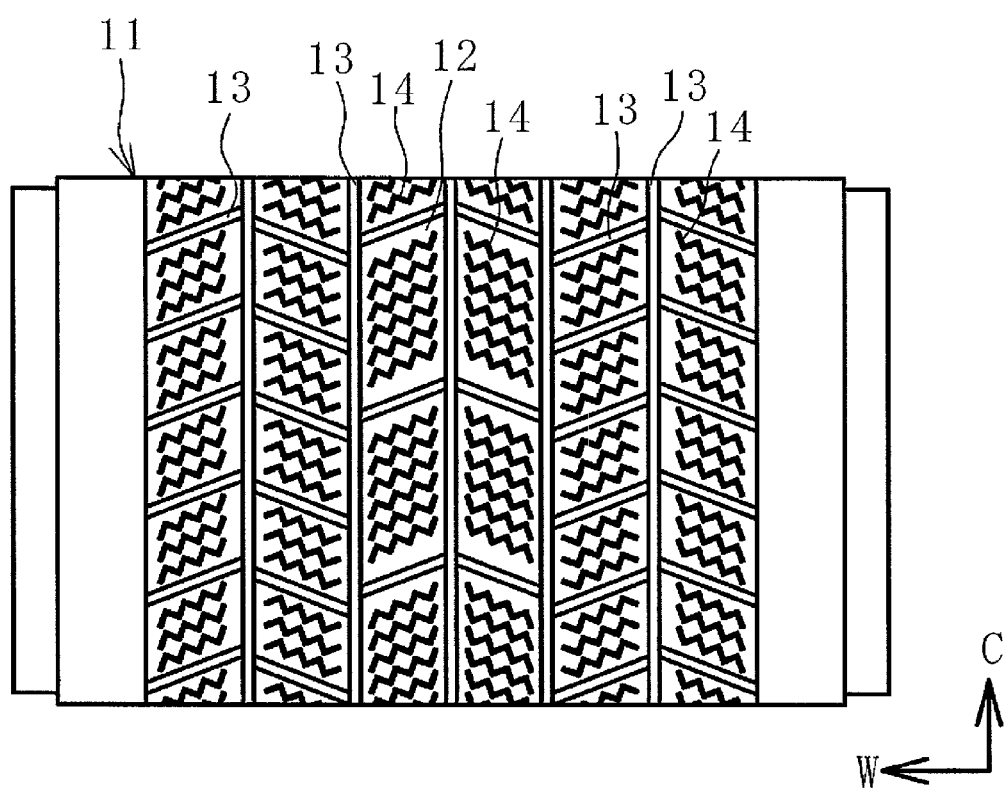
FIG. 2 is an explanatory drawing illustrating a molding surface of a studless-tire vulcanization mold as viewed in a plan view.

The mold 11 to be cleaned is not only a normal type mold but also, for example, a studless-tire vulcanization mold illustrated in FIG. 2. Groove forming projections 13 and sipe forming projections 14 are projected on the molding surface 12 of the mold 11. The groove forming projections 13 are casted integrally with the base material of the mold 11 and the sipe forming projections 14 are separately attached to the molding surface 12. The base material of the mold 11 is usually made of aluminum and the sipe forming projections 14 are made of steel or the like.

The thickness of the sipe forming projections 14 is about from 0.4 to 1.2 mm. The groove forming projections 13 may be thin depending on a tread pattern of a tire, for example, in the case of a complicated tread pattern. Thus, the sipe forming projections 14 or thin groove forming projections 13 are the parts that are easy to be scratched when the mold is cleaned. It is noted that a C arrow, an R arrow, and a W arrow described in FIG. 2, and FIGS. 3 to 7 respectively indicate a circumferential direction, a radius direction, and a width direction of a tire that is to be inserted into the mold 11 and vulcanized therein.

Figure 3:
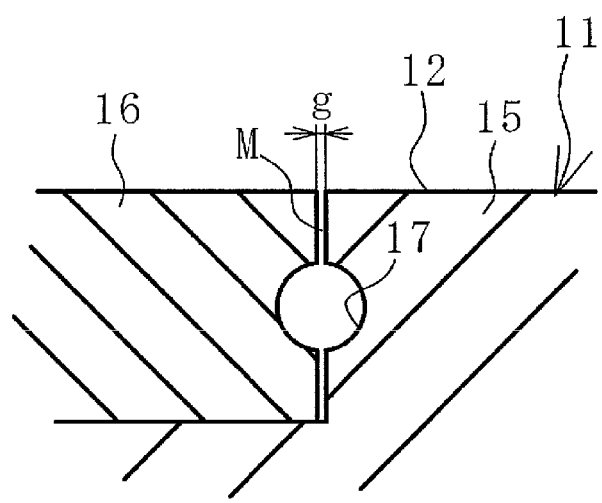
FIG. 3 is an explanatory drawing illustrating a molding surface of a cast splicing mold as viewed in an enlarged cross-section view.

Another example of the type of mold 11 to be cleaned is a cast splicing mold for pneumatic tire vulcanization illustrated in FIG. 3. The mold 11 is produced by so-called cast splicing in which a first casting part 15 is casted and a second casting part 16 is casted thereafter. By the solidification and shrinkage of a casted melting metal, a small gap g is defined in a cast splicing part M between the first casting part 15 and the second casting part 16. The size of the small gap g is, for example, from 5 to 80 μm. An exhaust hole 17 in communication with the small gap g is defined. In the mold 11, unnecessary air or gas when the tire is vulcanized is discharged from the molding surface 12 to the exhaust hole 17 through the small gap g, and then discharged out of the mold 11 through the exhaust hole 17. The small gap g is a part that is easy to be scratched when the mold is cleaned.

A procedure for cleaning the molding surface 12 of the mold 11 by using the cleaning system 1 will now be described.

First, the mold 11 to be cleaned is placed on the carrying-in conveyor apparatus 10*a*. Next, the inlet door 9*a* is opened, and the carrying-in conveyor apparatus 10*a* and the processing conveyor apparatus 10*b* are operated to move the mold 11 to be cleaned onto the processing conveyor apparatus 10*b* and position the mold 11 at a predetermined position. Then, the inlet door 9*a* is closed so that the cleaning booth 9 becomes a closed space. Provided here is an interlocking structure in which the laser oscillator 2 is not actuated until the cleaning booth 9 becomes a closed space.

Figure 4:
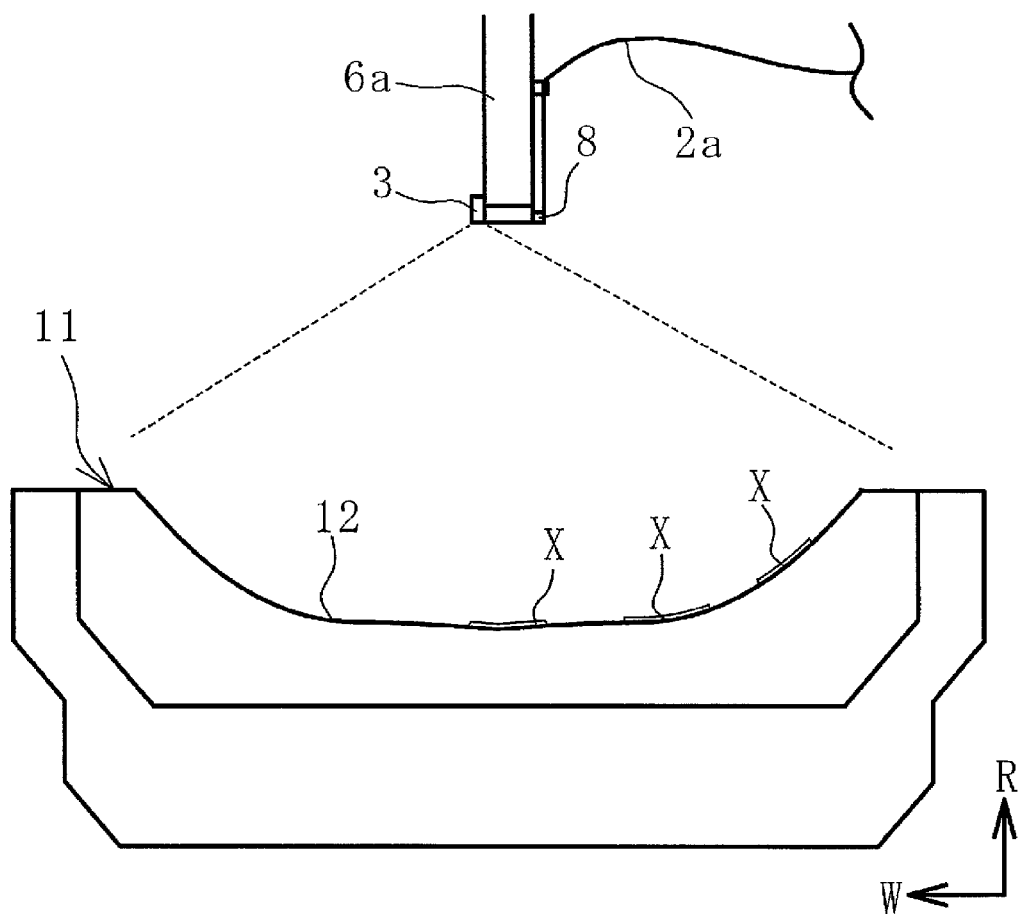
FIG. 4 is an explanatory drawing illustrating a camera and a mold to be cleaned as viewed in a front view.
Figure 5:
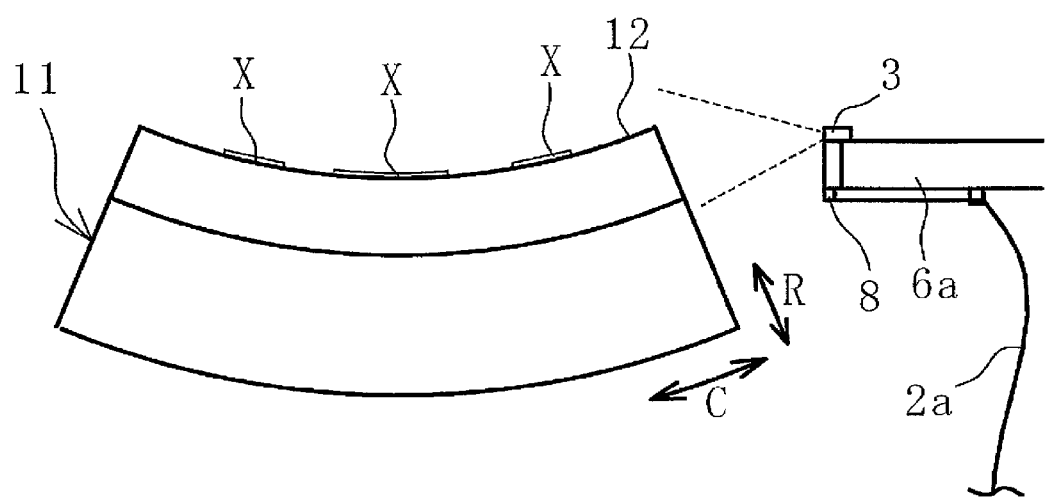
FIG. 5 is an explanatory drawing illustrating a camera and a mold to be cleaned as viewed in a side view.

Next, as illustrated in FIGS. 4 and 5, the arm 6 is moved to dispose the camera 3 at an appropriate position and three-dimensional image data of the molding surface 12 of the mold 11 is acquired. In this embodiment, a configuration is described in which one of the camera 3 is moved to a desired position (e.g. a position above or a position to the side of the molding surface 12) by the arm 6 to acquire the shape data of the molding surface 12. However, a configuration is possible in which a plurality of the camera 3 is provided, and three-dimensional image data of the molding surface 12 is acquired by using the plurality of stationary cameras 3 to capture each of top surface shape data and the side surface shape data of the molding surface 12.

Figure 7:
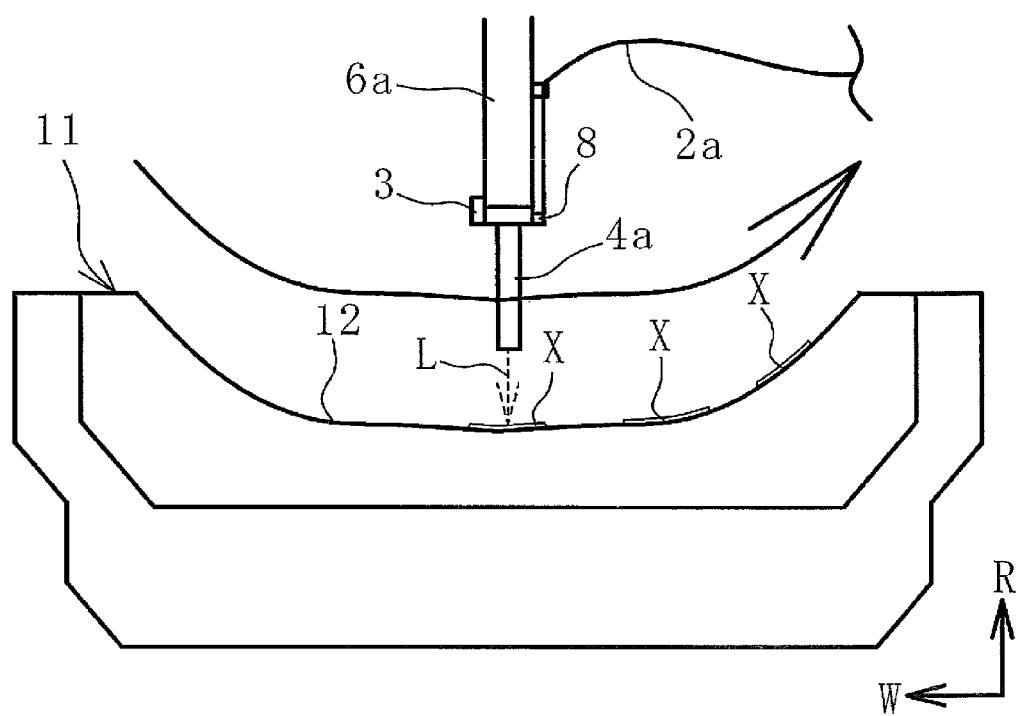
FIG. 7 is an explanatory drawing illustrating a laser head and a mold to be cleaned as viewed in a front view.

Next, the motion of the arm 6 is controlled on the basis of the acquired three-dimensional image data (shape data) of the molding surface 12 of the mold 11 to move the laser head 4 along the molding surface 12 as illustrated in FIG. 6 and FIG. 7. While the laser head 4 is being moved in this way, the molding surface 12 is irradiated with the laser beam L supplied from the laser oscillator 2. The dirt X adhered to the molding surface 12 is removed and cleaned by the emitted laser beam L.

To restrict irradiation unevenness of the laser beam L, the movement direction of the laser head 4 and the irradiation direction of the laser beam L are controlled while keeping the spacing between the tip of the laser head 4 and the opposing molding surface 12 as constant as possible. The movement velocity of the laser head 4 is kept as constant as possible, and the laser head 4 is moved to cover the range to be cleaned.

In this embodiment, although two laser heads 4*a*, 4*b* are used together to irradiate with the laser beam L, it is also possible to use either one of the laser heads 4 and the other laser head 4 thereafter. For example, the molding surface 12 is irradiated with the laser beam L by moving the laser head 4*a* having a relatively large laser irradiation width to cover the range to be cleaned, and then, the molding surface 12 is irradiated with the laser beam L by using the laser head 4*b* having a relatively small laser irradiation width.

As described above, according to the present technology, when cleaning the mold 11, three-dimensional image data of the molding surface 12 of the mold 11 to be cleaned is acquired by the camera 3. As such, the shape of the molding surface 12 can be accurately determined at the time of cleaning. As a result, even when many molds 11 having different molding surfaces 12 are to be cleaned, it is no longer required to perform manual operations for invoking the shape data for the molding surface 12 of the mold 11 to be cleaned and to check the correspondence relation between the actual mold and the shape data every time the cleaning is performed.

And, since the laser head 4 is moved along the molding surface 12 on the basis of the acquired image data while irradiating with the laser beam L, it is possible to prevent scratches on the molding surface 12 while efficiently removing the dirt X therefrom without requiring manual operations by a person, even for molds 11 having the molding surfaces 12 with complicated shapes, such as studless-tire vulcanization molds or cast splicing molds for pneumatic tire vulcanization.

Additionally, even if the shape of the molding surface 12 changes with time, there are advantages compared to a case where pre-recorded shape data of the molding surface 12 is used in that the molding surface 12 can be more completely cleaned without leaving traces of dirt because the image data of the molding surface 12 is acquired at the time of cleaning, and this image data can be used for moving the laser head 4.

In this embodiment, the image data for the cleaned molding surface 12 is re-acquired by the camera 3, and the cleaning state of the molding surface 12 is determined on the basis of the acquired image data. The determined cleaning state and the position information of the molding surface are stored in the control device 7. After irradiating the entire range of the molding surface 12 with the laser beam L, for the positions of the molding surface 12 in which the determined cleaning state does not satisfy a preset standard, the cleaning is performed again by moving the laser head 4 to the positions and irradiating with the laser beam L.

A standard for determining whether the cleaning state is appropriate (dirt X has been removed) or inappropriate (dirt X is remaining) is input and set to the control device 7 in advance. By using the control device 7, whether the determined cleaning state satisfies the preset standard is determined.

The standard for determining the cleaning state is set on the basis of, for example, a color density of the image data for the molding surface 12 acquired by the camera 3. If the density is greater than a certain degree, the cleaning state indicating that the dirt X is remaining is set. Alternatively, it is possible to acquire the image data for the molding surface 12 immediately before and immediately after the laser beam L is emitted, compare these image data, and set the standard on the basis of the change in the color density. If the color density has not changed or the degree of the change is small, the cleaning state indicating that the dirt X is remaining is set. With this configuration, only the positions (range) that are particularly dirty are re-cleaned later, which is advantageous for removing the dirt X efficiently and cleanly.

It is also possible to input and set particular portions to the control device 7 in advance, and for the preset particular portions, perform cleaning by using the laser head 4b having a relatively small laser irradiation width or by using the laser head 4a having a relatively large laser irradiation width with the laser head 4b having a relatively small laser irradiation width. Examples of the particular portions include a range having a complicated shape such as a range around the bottom of the sipe forming projections 14 illustrated in FIG. 2, or the inner circumferential surface of the small gap g in the cast splicing part M illustrated in FIG. 3.

With this configuration, the cleaning can be finished in a short time for relatively flat and wide portions by using the laser head 4a having a relatively large laser irradiation width. Meanwhile, for portions in which concavities and convexities exist complicatedly in a narrow range on the molding surface 12, the portions having complicated shapes can be irradiated evenly with the laser beam L by using the laser head 4b having a relatively small laser irradiation width, and as a result, the dirt X can be removed cleanly.

The temperature of the molding surface 12 that is irradiated with the laser beam L can be successively detected by the temperature sensor 8. An acceptable temperature is input and set to the control device 7 in advance. The acceptable temperature is set to a predetermined temperature that does not reach the melting temperature of the mold 11. The irradiation with the laser beam L is suspended when the temperature detected by the temperature sensor 8 exceeds the preset acceptable temperature. With this configuration, even if malfunctions such as the reduction of the movement velocity or the stopping of the laser head 4 occur due to unintentional factors, the molding surface 12 can be avoided from being overheated by the emitted laser beam L. As such, a defect that the molding surface 12 is thermally deformed or scratched by the laser beam L can be prevented.

After the cleaning of the mold 11 is finished, the outlet door 9b is opened and the processing conveyor belt 10b and the carrying-out conveyor belt 10c are operated to move the cleaned mold 11 out of the cleaning booth 9. At this time, the inlet door 9a is opened and the carrying-in conveyor belt 10a is operated to move the next mold 11 to be cleaned from the outside to the inside of the cleaning booth 9 and position the mold 11 at a predetermined position on the processing conveyor 10b. In this way, the mold 11 is cleaned sequentially and continuously.

The invention claimed is:

1. A mold cleaning system comprising:
   a laser oscillator;
   a laser head configured to irradiate a molding surface of a mold with a laser beam supplied from the laser oscillator;
   an arm configured to move the laser head freely in three dimensions;
   a control device configured to control motion of the arm; and
   a camera configured to acquire three-dimensional image data of a molding surface of a mold to be cleaned;
   wherein
   by controlling the motion of the arm on a basis of the image data acquired by the camera when the mold is cleaned, the laser head is moved along the molding surface while irradiating with the laser beam to clean the molding surface.

2. The mold cleaning system according to claim 1, wherein the mold cleaning system is configured to:
   determine a cleaning state of the molding surface on a basis of three-dimensional image data of a cleaned molding surface of a mold acquired by the camera;
   store the determined cleaning state and position information of the molding surface in the control device; and
   for positions on the molding surface in which the determined cleaning state does not satisfy a preset standard, perform cleaning again by irradiating with the laser beam from the laser head.

3. The mold cleaning system according to claim 2, further comprising a plurality of laser heads having different laser irradiation widths as the laser head, wherein the mold cleaning system is configured to perform cleaning for particular preset portions by using a laser head having a relatively small laser irradiation width or by using a laser head having a relatively large laser irradiation width with the laser head having a relatively small laser irradiation width.

4. The mold cleaning system according to claim 3, further comprising a temperature sensor configured to successively detect a temperature of the molding surface that is irradiated with the laser beam, wherein the mold cleaning system is configured to suspend an irradiation with the laser beam when the temperature detected by the temperature sensor exceeds a preset acceptable temperature.

5. The mold cleaning system according to claim 4, wherein the mold is a studless-tire vulcanization mold or a cast splicing mold for pneumatic tire vulcanization.

6. The mold cleaning system according to claim 1, further comprising a plurality of laser heads having different laser irradiation widths as the laser head, wherein the mold cleaning system is configured to perform cleaning for particular preset portions by using a laser head having a relatively small laser irradiation width or by using a laser head having a relatively large laser irradiation width with the laser head having a relatively small laser irradiation width.

7. The mold cleaning system according to claim 1, further comprising a temperature sensor configured to successively detect a temperature of the molding surface that is irradiated with the laser beam, wherein the mold cleaning system is configured to suspend an irradiation with the laser beam when the temperature detected by the temperature sensor exceeds a preset acceptable temperature.

8. The mold cleaning system according to claim 1, wherein the mold is a studless-tire vulcanization mold or a cast splicing mold for pneumatic tire vulcanization.

* * * * *